US006675132B2

(12) United States Patent
Vataja

(10) Patent No.: US 6,675,132 B2
(45) Date of Patent: Jan. 6, 2004

(54) METHOD FOR MAINTAINING AN OBJECT, AND A MAINTENANCE SYSTEM

(75) Inventor: Timo Vataja, Tampere (FI)

(73) Assignee: Nokia Corporation, Espoo (FI)

( * ) Notice: Subject to any disclaimer, the term of this patent is extended or adjusted under 35 U.S.C. 154(b) by 93 days.

(21) Appl. No.: 09/981,554

(22) Filed: Oct. 17, 2001

(65) Prior Publication Data

US 2002/0049567 A1 Apr. 25, 2002

(30) Foreign Application Priority Data

Oct. 20, 2000 (FI) ............................................ 20002319

(51) Int. Cl.[7] ................................................ G06F 11/30
(52) U.S. Cl. ........................................ 702/188; 714/25
(58) Field of Search ........................... 702/188, 35, 36, 702/58, 59, 63, 150, 183, 185; 714/25, 26; 701/300

(56) References Cited

U.S. PATENT DOCUMENTS 5,515,419 A * 5/1996 Sheffer ....................... 455/456
6,093,146 A * 7/2000 Filangeri .................... 600/300
6,292,687 B1 * 9/2001 Lowell et al. .............. 600/515

FOREIGN PATENT DOCUMENTS

FI 991103 11/2000
WO WO 01/52517 A1 7/2001
WO WO 01/93220 A1 12/2001

* cited by examiner

*Primary Examiner*—Marc S. Hoff
*Assistant Examiner*—Edward Raymond
(74) *Attorney, Agent, or Firm*—Perman & Green, LLP

(57) ABSTRACT

The invention relates to a method for maintaining an object (1), and a maintenance system. At the object (1), the operation is monitored to report the situation prevailing at the object (1) to on-call duty personnel (14). In the method, at least one transmission step is taken, in which at least one notice message is formed, and at least one formed notice message is transmitted by short-range communication means (4). If, within the range of the short-range wireless communication means (4), at least one device (10), equipped with means (5) for receiving said at least one transmitted notice message, detects the transmitted notice message, at least a receiving step to receive the transmitted notice message and a sorting step are further taken in said device (10). At the sorting step, it is sorted out, whether information about the prevailing situation is to be transmitted to the on-call duty personnel, wherein if the transmission can be performed, information about the prevailing situation is transmitted to the on-call duty personnel (14).

13 Claims, 2 Drawing Sheets

METHOD FOR MAINTAINING AN OBJECT, AND A MAINTENANCE SYSTEM

Figure 1:
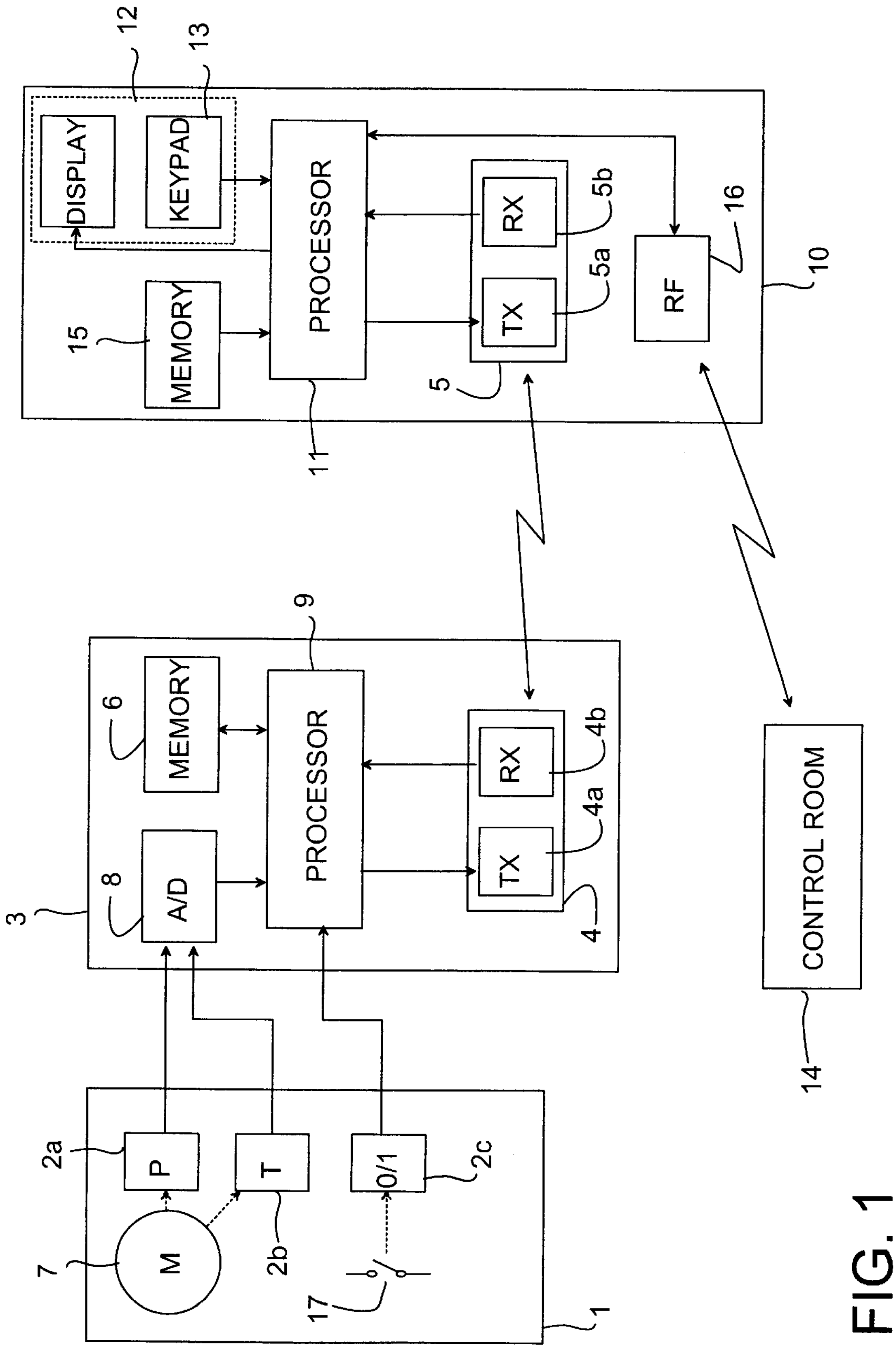

The present invention relates to a method for maintaining an object, in which the operation of the object is monitored to report the prevailing situation at the object to on-call duty personnel. The invention also relates to system for maintaining an object, the object having means for monitoring its operation, and the system further comprising reporting means for reporting the prevailing situation to on-call duty personnel. The invention also relates to a wireless communication device arranged to be used in a system for maintaining an object, at which object monitoring of its operation is arranged to be performed to notify the situation prevailing at the object to on-call duty personnel.

For maintaining various objects, methods have been developed, in which a monitoring system is installed in the object, to monitor the operation of the object and, when a failure is detected, to report it to a control room, on-call duty personnel, or the like. On the basis of this notice of failure, a maintenance person or maintenance persons can be assigned to the object to repair the defect. Examples of such objects that can be mentioned include e.g. lifts, equipment related to public utility services, such as pump stations and the like, automatic fuel stations, ticket vending machines, printers, gambling machines, telefax machines, etc. Generally, it can be stated that the objects to be monitored and maintained, as meant in the present description, refer to such objects where no maintenance personnel is available in the direct vicinity of the object. Furthermore, a notice does not need to be a result from detecting a failure, but it can be a notice, for example, that the quantity of a drink sort in an automatic drink vending machine has fallen below a predetermined limit. In this case, the purpose of the notice is to inform the person maintaining the object that the automatic drink vending machine should be supplied with more drinks.

For example, lifts are known which are equipped with various indicators to detect defects. The indicators can be used to monitor e.g. the operation of the motor of the lift, the illumination, the opening and closing of doors, the number of service hours, etc. Furthermore, the indicators can be coupled to a control unit which examines the signals given by the indicators and compares them with predetermined threshold values and/or normal values. If the control unit detects that the signal given by an indicator differs from a normal value, the control unit advantageously generates a notice of defect, where the object and the defect are preferably specified. If a data transmission connection is arranged from the object to be monitored to a control room for monitoring notices of defects, on-call duty personnel, or the like, the notice of defect is transmitted by using this data transmission connection. Such a data transmission connection intended for the transmission of a notice of defect is often arranged as a fixed data transmission connection to the on-call duty personnel of a service company. Such a fixed connection is relatively expensive and, on the other hand, this fixed connection is in a standby state for most of the time, wherein the utilization of the connection is ineffective. There are also systems for notices of failure, based on a telecommunication network, wherein in the occurrence of a defect, the monitoring system sets up a telephone connection to the on-call duty personnel by using either a public switched telecommunication network or a wireless mobile communication network. This requires that a telecommunication terminal complying with either a GSM communication system or a public switched telecommunication connection is installed in connection with the system to be monitored, which also raises the costs of the monitoring system.

Due to e.g. said costs, all objects are not necessarily provided with automatic transmission of a notice of defect to the on-call duty personnel. In such a case, the object, such as a lift, is equipped with a notice, a sticker or the like, with instructions for failure situations. Thus, if the monitoring system detects a failure, it generates e.g. a sound and/or visual message in the vicinity of the object. For example at a pump station, a blinking red light indicates that the pump station has a defect that needs to be repaired. Thus, a person who e.g. passes by the object and detects such a notice of a defect, can follow the instructions given in the notice and notify about the failure in the object. For example, the person contacts on-call duty personnel by telephone and tells about the notice of defect. Such an arrangement has e.g. the drawback that the on-call duty personnel is informed about the failure after a relatively long time from the occurrence of the actual defect, and in some cases, the defect can fail to be detected at all until the defect in the device causes serious damage. On the other hand, not all persons who have observed a notice of defect necessarily inform about the defects to the on-call duty personnel. This may be due e.g. to the fact that the call costs may be charged from the person who gave the notice, it is found difficult to give a notice, and it can be even impossible if there is no phone available, such as a public phone in the vicinity of the object. Thus, the user should have to write down the telephone number and find a phone where information about the notice could be transmitted to the on-call duty personnel.

It is an aim of the present invention to provide a method for maintaining a system and a maintenance system in which the above-mentioned drawbacks are preferably eliminated. The invention is based on the idea that the object to be monitored is equipped with a short-range communication device, by which a notice of failure can be transmitted to a device which is located in the vicinity of the object and is equipped with means for receiving this notice. The method according to the present invention is primarily characterized in that in the method, at least a transmission step is taken, in which:

- at least one notice message is formed, and
- at least one formed notice message is transmitted by short-range wireless communication means, wherein if, within the range of the short-range wireless communication means, at least one device, equipped with means for receiving said at least one transmitted notice message, detects the transmitted notice message, at least the following steps are further taken in said device:

- a receiving step for receiving the transmitted notice message, and
- a sorting step to sort out whether information about the received notice message is to be transmitted from the device to the on-call duty personnel, wherein if the transmission can be performed, information about the prevailing situation is transmitted to the on-call duty personnel.

The system according to the present invention is primarily characterized in that the system further comprises at least means for generating at least one notice message on the prevailing situation, short-range wireless communication means for transmitting said notice message, a device comprising receiving means for receiving said at least one transmitted notice message, and sorting means to sort out whether information about the received notice message is to be transmitted from the device to the on-call duty personnel, wherein the notice means comprise transmitting means for transmitting information about the prevailing situation to the on-call duty personnel. The wireless communication device according to the present invention is primarily characterized in that the wireless communication device comprises at least receiving means for receiving at least one notice message generated on the situation prevailing at the object and transmitted by short-range wireless communication means, and that the wireless communication device further comprises at least sorting means to sort out whether information about the received notice message is to be transmitted from the device to the on-call duty personnel, and transmitting means for transmitting information about the prevailing situation to the on-call duty personnel.

By means of the present invention, considerable advantages are achieved when compared to systems and methods of prior art. By using the method of the invention, it is possible to provide a system and a device which are less expensive than the prior art but still have a facility to give a notice on failure. Using the method of the invention, an arrangement for notifying on failures can be implemented even in devices where it is not reasonable and profitable to implement arrangements for notices of defect according to prior art. Furthermore, with the method of the invention, the advantage is obtained that a notice on failure can be automatically supplemented with information that facilitates the repairing of the failure more than in systems in which a passer-by, on the basis of a notice of defect, transmits the information orally by telephone, wherein he/she is asked to give the location of the defective device and to describe the failure, if possible. Yet another advantage that should be mentioned is that a passer-by can prove his/her presence for example in a situation in which an automatic drink vending machine did not give a drink although the passer-by had made a payment.

Figure 2:
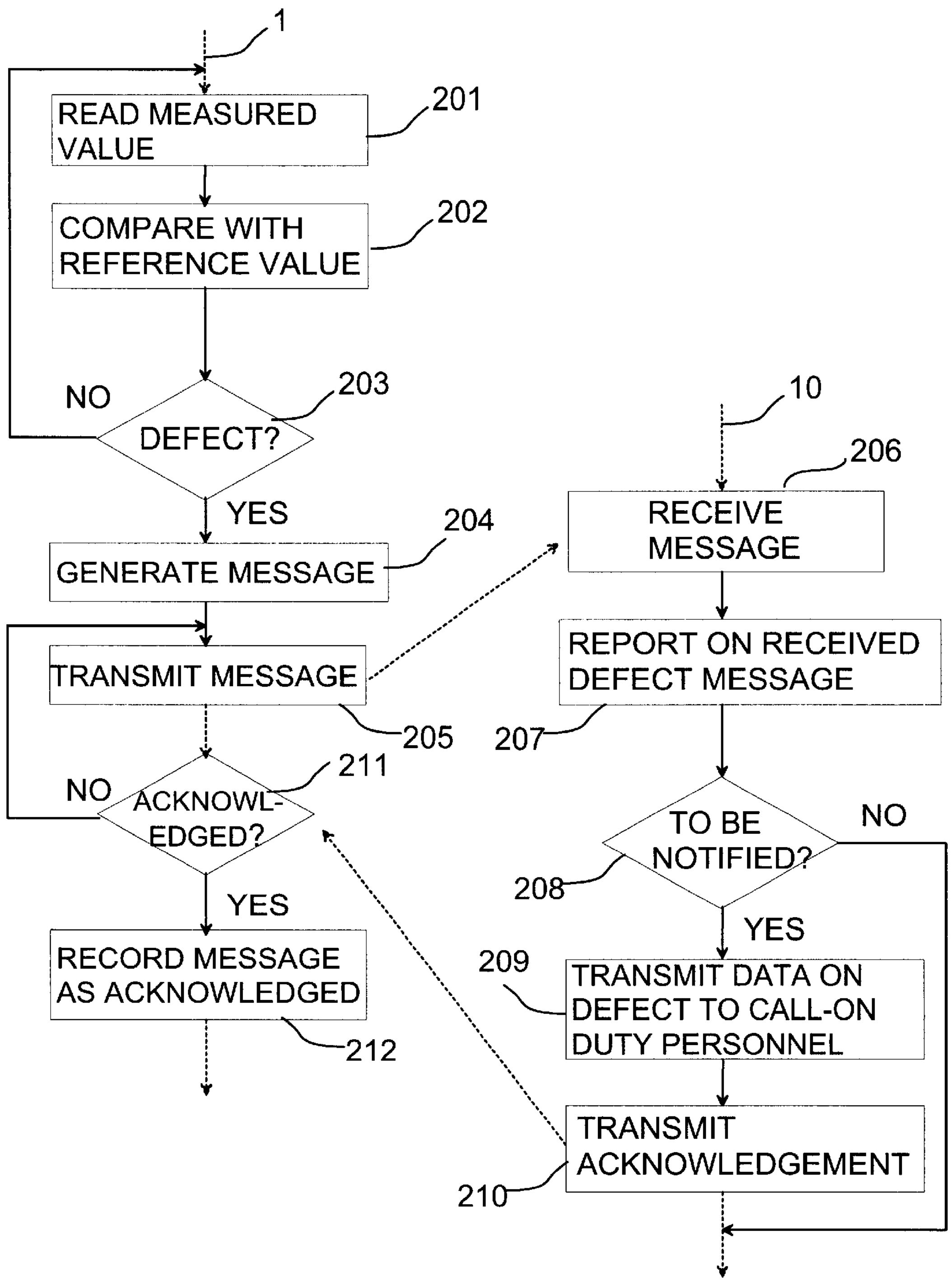

In the following, the invention will be described in more detail with reference to the appended drawings, in which FIG. 1 shows a system according to a preferred embodiment of the invention in a reduced block chart, and FIG. 2 shows, in a block chart, different steps in the method according to a preferred embodiment of the invention.

FIG. 1 shows a maintenance system complying with a preferred embodiment of the invention. The system is arranged for monitoring the operation of an object 1. The object 1 can be a single device, a device belonging to a larger system, or a whole system. In view of applying the present invention, the details of the object 1 are not significant as such. The object 1, whose operation is monitored, is equipped with one or more indicators 2*a*, 2*b*, 2*c*, a control block 3, as well as communication means 4. The structure of the single or several indicators 2*a*, 2*b*, 2*c* arranged in connection with the object 1 depends, for example, on the object 1 to be monitored at the time. The structure of the indicator 2*a*, 2*b*, 2*c* is not significant as such in view of applying the present invention, nor is the structure of the object 1. For example, the indicator 2*a*, 2*b*, 2*c* can monitor a voltage, a current, an output, a speed of rotation, the position of a switch 17, measure the time, or the like. If necessary, several indicators 2*a*, 2*b*, 2*c* can be arranged in connection with the same object 1, and they can also measure different information about the object 1. The control block 3 comprises a processor 9, such as a microprocessor. The control block 3 is preferably also equipped with a memory 6 for storing data needed in the operation of the maintenance system, such as reference and/or threshold values, as well as for generating a notice. The control block 3 can further comprise a timer for measuring the operating time of the object as well as for determining time data on the moment of detecting a defect.

The communication means 4 comprise short-range wireless communication means which comprise at least a transmitter 4*a* by which the notice can be transmitted to be received by a device 5 suitable for receiving the notice. Furthermore, the communication means 4 preferably comprise receiving means 4*b* by which an acknowledgement of receipt of the notice can be received, if necessary, as will be discussed below in this description. As the short-range communication means 4, it is possible to use for example short-distance radio communication technology developed under the name Bluetooth, infrared data transmission (for example IrDA, Infrared Data Association), inductive data transmission, a wireless local area network WLAN, or the like. The control block 3 transfers the notice to the communication means 4 for transmission. If the communication means 4 also comprise a receiver 4*b*, for example said acknowledgement data is transferred from the receiver to the control block 3.

In the following, the operation of the method according to a preferred embodiment of the invention will be described with reference to the flow chart shown in FIG. 2. The single or several indicators 2*a*, 2*b*, 2*c* arranged in connection with the control block 3 generate a measured variable on a functional element of the object 1. For example in the system of FIG. 1, one indicator 2*a* generates a voltage signal which is proportional to the input power of a motor 7 and is transferred to an analog-to-digital converter 8 in the control block 3. This analog-to-digital converter 8 converts the voltage signal to digital format, wherein it can be transferred to a processor 9 in the control block. On the basis of the status of a switch 17, a second indicator 2*b* generates a binary signal which can be used to indicate that the switch 17 is turned off or on. A third indicator 2*c* generates a voltage signal which is proportional to the temperature of the motor 7 and is transmitted to the analog-to-digital converter 8 in the control block 3, to be first converted to a digital signal and then transferred to the processor 9. The processor 9 of the control block 3 reads at intervals the measured values generated by the indicators 2*a*, 2*b*, 2*c*. This operation is illustrated with block 201 in the flow chart of FIG. 3. After this, the processor compares the measured values with stored reference values (block 202). A reference value can be, for example, a numerical value corresponding to a given maximum electrical power or temperature. Thus, on the basis of the comparison, the processor 9 deduces whether the measured value is within the range of normal values or if it is a value deviating from the normal state, that is, there is probably a defect or a situation requiring maintenance (block 203). For example at a pump station, a high input power of the motor 7 may be due to a clogging in the sewage. Also a high temperature can indicate a situation of overload of the motor 7. If the processor 9 deduces that there is a failure situation, the processor 9 generates a notice of defect and preferably stores it in a memory 6 (block 204). This notice data can be supplemented with information about the defect that was detected, possibly the time of detecting the defect, information about the state of the object 1 at the moment of detecting the defect (measured value), information about where the notice should be transmitted, etc. This data related to the defect can be formulated for example as a message that is transmitted to the communication means 4. The processor 9 preferably sets a defect flag as a sign that there is a failure situation in the object 1.

The communication means 4 transmit the message (block 205). For transmitting the message, the transmitter 4*a* performs, if necessary, encoding modulation for encoding the message as a signal suitable for the communication channel used. For example when the Bluetooth technology is applied, a modulation is made, in which a binary message is converted to radio-frequency signals. In a corresponding manner, when the infrared technology is applied, the information contained in the message is used to control the intensity of the light generated by an infrared illuminator. Furthermore, when the infrared technology is applied, a message waiting for transmission at the object is indicated to bypassers preferably as a light signal or an acoustic signal. For example, in connection with lifts, the control panel can be equipped with a light to indicate that there is a notice message waiting for transmission in the lift. Thus, a bypasser will know to direct a device 10 suitable for receiving the message towards the infrared transmitter in the object and, if necessary, go even closer to the object. This is necessary, if the device 10 is e.g. in a pocket or a bag of the bypasser or in another place which the signal transmitted by the the infrared transmitter of the object does not reach at a sufficiently strong level. The transmission of the message can be repeated, if necessary, until an acknowledgement is received that the notice has been transmitted to on-call duty personnel or the like, or until the failure situation has been cleared (block 211).

Let us assume that a person comes to the vicinity of an object having a notice waiting for transmission, and this person carries a device 10 equipped with receiving means **5*b* suitable for receiving the notice. Thus, these receiving means 5*b* detect the signal transmitted by the communication means 4 and convert the signal to a baseband signal (demodulation) and interpret the information contained in the signal (block 206). If necessary, this information is stored in the memory 15 of the device 10. The receiving means 5*b* can be for example local communication means 5, such as a Bluetooth receiver or an IrDA receiver, arranged in a wireless communication device. The notice message is transferred from the receiving means 5*b* to the processor 11 of the device 10, where the content of the message is deciphered. The processor 11 detects that there is a notice message, wherein the processor 11 generates a notice on this to the user of the device 10, for example as a sound and/or text message via a user interface 12. In the user interface 12, it can be notified for example that the person is in the vicinity of an object which has a device 1 having a failure that should be reported further. Furthermore, it is possible to give the location of the object, the type of the device, possibly information about the defect, as well as contact data where the notice should be transmitted (block 207). Moreover, the person can be asked if the notice shall be transmitted (block 208). If the user responds, e.g. by pressing a certain button on a keypad 13, that the notice can be transmitted further, the transmission of the notice is started for example in the following way. The processor of the device 10 transmits information about the defect to second communication means 16 of the device 10, such as a wireless communication device. Information on where the notice is to be transmitted is preferably also transferred in this connection. This information is preferably an on-call duty telephone number which was given in the notice message. After this, the connection is set up by using methods known as such, either as a speech connection or a data connection, or a short message is generated to be transmitted to the on-call duty personnel, for example in a control room 14 (block 209). After the connection has been set up, it is possible to transmit information related to the defective device 1** to locate the defective device as well as to find out the reason for the failure, if it is known. When a text message transmission is used, no actual data transmission connection is set up but a text message is generated which contains information required for locating the defect as well as the telephone number of a device suitable for receiving text messages. After the notice has been received by the on-call duty personnel, it is possible to take the necessary measures to repair the defect.

If the object is located in such a position where the second communication means 16 of the user's device 10, such as a mobile communication device, is not capable of communicating with the wireless communication network, it is possible in the method according to a preferred embodiment of the invention to proceed in the following way. The notice message is received in the device 10 and stored in the memory 15. When a data transmission connection can be set up with the communication network, the notice message is transmitted to the on-call duty personnel 14.

In the method according to a preferred embodiment of the invention, the notice is also acknowledged. This can be implemented, for example, in such a way that after a connection to the on-call duty personnel has been set up, the processor 11 of the device 10 generates an acknowledgement message. The acknowledgement message is transferred to the local communication means 5 of the device 10, where the acknowledgement message is converted in a transmitter **5*a* to a signal suitable for the local communication channel (block 209). The receiver 4*b* of the communication means 4 arranged in connection with the object 1 detects this signal and converts it to a baseband signal (block 210). From the communication means 4, the acknowledgement message is transferred to the control block 3, where the processor 9 examines the content of the acknowledgement message. The acknowledgement message contains information about the acknowledgement message to which it relates, wherein the processor 9 can record this acknowledgement message as having been transmitted further (block 212). After this, it is possible to discontinue retransmitting the notice message. This arrangement of acknowledging has the advantage that retransmitting of the notice by the communication means 4** can be discontinued after the notice has been transmitted further. In this way, several notices of the same defect to the on-call duty personnel are avoided.

In connection with the acknowledgement, it is also possible to transmit information from the on-call duty personnel 14 to the object 1, such as control data, parametres, price data, etc. Before transmitting the information, the person who reported the notice can still be asked if he/she allows the transmission of such information to the object 1. In the transmission of this information, it is possible to apply methods known as such, including the transmission of short messages, the transmission of dual tone multiple frequencies (DTMF) signals, or the like.

The on-call duty telephone number can also be such a telephone number to which calling is free of charge. Thus, no costs will be caused for the call to the person who reports about the notice to the on-call duty personnel. The present invention also makes it possible that the person can be paid a compensation for transferring the notice. This can be fulfilled, for example, in such a way that in connection with the telephone bill, the sum of the compensation is credited in the telephone bill, wherein the telephone operator charges the compensation from the company responsible for the maintenance system. Another alternative is that the compensation is paid on the account of the person in question.

The receiving means **5*b* for receiving the notice are arranged, for example, in connection with a wireless communication device, such as a GSM mobile phone. Mobile stations are already known, in which such local communication means 5** are already implemented, wherein the functions of the method of the invention for reporting about the notice and for generating an acknowledgement, can be primarily implemented by programs in the application software of the wireless communication device.

In addition to repairing defects, the present invention can also be used for maintenance measures. Thus, the object 1 is equipped with e.g. a service hour counter, wherein a notice can be generated about exceeding a given number of service hours. This number of service hours can be a sign that maintenance measures must be taken at the object 1. Furthermore, the invention can be applied in connection with e.g. automatic drink vending machines and automatic fuel stations in such a way that the object 1 transmits, at intervals, information about the situation of the object 1, such as the quantity of different drink sorts, the sum of money contained in a money box (not shown), etc. If such a notice is not received within a given time by the on-call duty personnel, it is possible to send a maintenance person to check the reason why no notice was received from the object 1. The reason for the missing notice may be, for example, that the object 1 has been damaged or removed from its position.

In the method according to the invention, it is possible to store information to identify the person who gave the notice, time data about the moment of receiving the notice in the device 10, time data about the moment of transmission of the notice to the on-call duty personnel 14, and so on, wherein the person who transmitted information about the notice can, if necessary, show that he/she was present at the moment of transmission of the notice. Thus, the legal protection of the person is improved e.g. in a situation in which the person has made a payment in an automatic vending machine but the vending machine has not dispensed the product paid for, such as fuel or a soft drink. On the other hand, the invention can also be applied in such a manner that it is possible to remain anonymous when transmitting information about the notice. Thus, for example, the person sets "own number sending" off in his/her mobile station before calling the on-call duty personnel.

It is obvious that the present invention is not limited solely to the above-presented embodiments, but it can be modified within the scope of the appended claims.

What is claimed is:

1. A method for maintaining an object (1), in which the operation of the object (1) is monitored to report the prevailing situation at the object (1) to on-call duty personnel (14), characterized in that in the method, at least a transmission step is taken, in which:

at least one notice message is formed, and at least one formed notice message is transmitted by short-range wireless communication means (4), wherein if, within the range of the short-range wireless communication means (4), at least one device (10), equipped with means (5) for receiving said at least one transmitted notice message, detects the transmitted notice message, at least the following steps are further taken in said device (10):

a receiving step for receiving the transmitted notice message, and a sorting step to sort out whether information about the received notice message can be transmitted from the device (10) to the on-call duty personnel (14), wherein if the transmission can be performed, information about the prevailing situation is transmitted to the on-call duty personnel.

2. The method according to claim 1, characterized in that in the method, in addition to said sorting step, a storing step is taken to store the notice message in the memory (15) of the device (10), if it was sorted out at the sorting step that the transmission cannot be performed, wherein a retransmission is attempted later.

3. The method according to claim 1, characterized in that in the device (10) that received the notice message, the user of said device is informed about the received notice message, wherein at said sorting step, the user of the device (10) that received the notice message elects whether information about the notice is to be transmitted to the on-call duty personnel (14).

4. The method according to claim 1, characterized in that for transmitting information about the notice message, a data transmission connection is set up from said device (10) to the on-call duty personnel (14).

5. The method according to claim 1, characterized in that in the method, also an acknowledgement step is taken, in which an acknowledgement is transmitted from said device (10) about the transmission of the notice message to the on-call duty personnel (14), wherein said acknowledgement is received at the object (1) and the notice is recorded as having been transmitted.

6. The method according to claim 5, characterized in that in the method, the transmission of said notice message is repeated at intervals, wherein retransmissions of the notice message are discontinued, if said acknowledgement is received at the object (1).

7. A system for maintaining an object (1), the object (1) having means (2*a*, 2*b*, 2*c*) for monitoring its operation, and the system further comprising reporting means (16) for reporting the prevailing situation to on-call duty personnel (14), characterized in that the system further comprises at least means for generating at least one notice message on the prevailing situation, short-range wireless communication means (4*a*) for transmitting said notice message, a device (10) comprising receiving means (5*b*) for receiving said at least one transmitted notice message, and sorting means (11, 12, 13) to sort out whether information about the received notice message can be transmitted from the device (10) to the on-call duty personnel, wherein the notice means comprise transmitting means (16) for transmitting information about the prevailing situation to the on-call duty personnel.

8. The system according to claim 7, characterized in that the device (10) comprises means (12) for notifying the user of said device about the received notice message, wherein said sorting means comprise election means (13) for electing whether information about the notice shall be transmitted to the on-call duty personnel (14).

9. The system according to claim 7, characterized in that it further comprises means (16) for setting up a data transmission connection to the on-call duty personnel (14).

10. The system according to claim 7, characterized in that it also comprises means (11, 15) for generating an acknowledgement message, means (5*a*) for transmitting the acknowledgement from said device (10), wherein the object (1) comprises means (4*b*) for receiving said acknowledgement message, and means (6, 9) for recording the notice message as having been transmitted.

11. The system according to claim 7, characterized in that the means (2*a*, 2*b*, 2*c*) for monitoring the operation comprise means for measuring the temperature and/or means for measuring the power.

12. The system according to claim 7, characterized in that it comprises means (14) for storing at least data about the person who transmitted information about the notice message, data about the moment of receiving the notice message in the device (10), and/or data about the moment of transmission of information about the notice message to on-call duty personnel (14).

13. A wireless communication device arranged to be used in a system for maintaining an object (1), at which object (1) monitoring of its operation is arranged to be performed to notify the situation prevailing at the object (1) to on-call duty personnel (14), characterized in that the wireless communication device (10) comprises at least receiving means (5*b*) for receiving at least one notice message generated on the situation prevailing at the object (1) and transmitted by short-range wireless communication means (4*a*), and that the wireless communication device (10) further comprises at least sorting means (11, 12, 13) to sort out whether information about the received notice message can be transmitted from the device (10) to the on-call duty personnel, and transmitting means (16) for transmitting information about the prevailing situation to the on-call duty personnel.

* * * * *